W. H. LILLY.
BUTTER-WORKER.
No. 172,133. Patented Jan. 11, 1876.
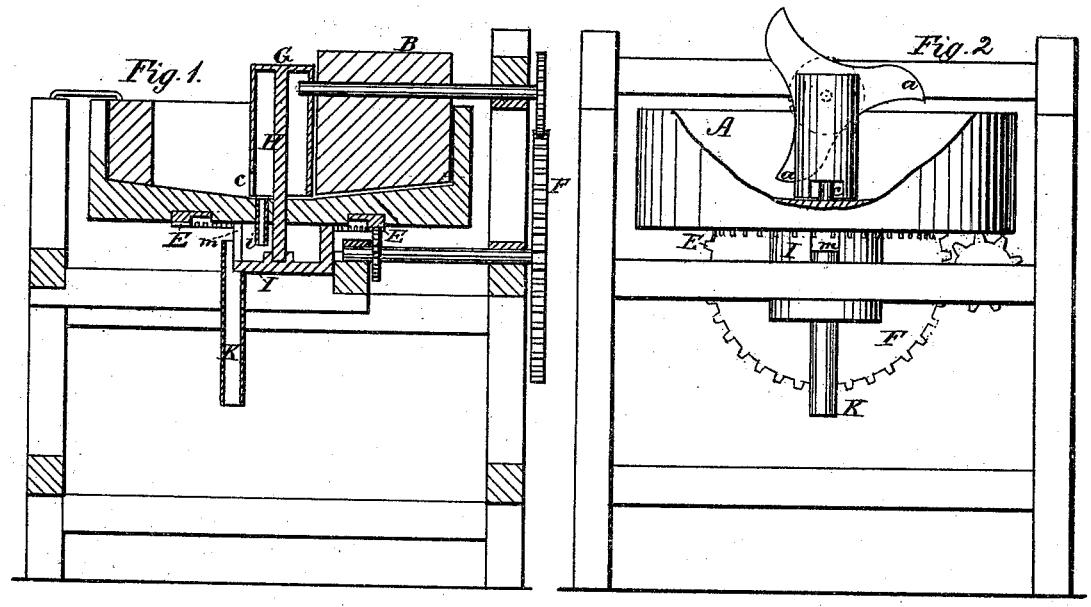
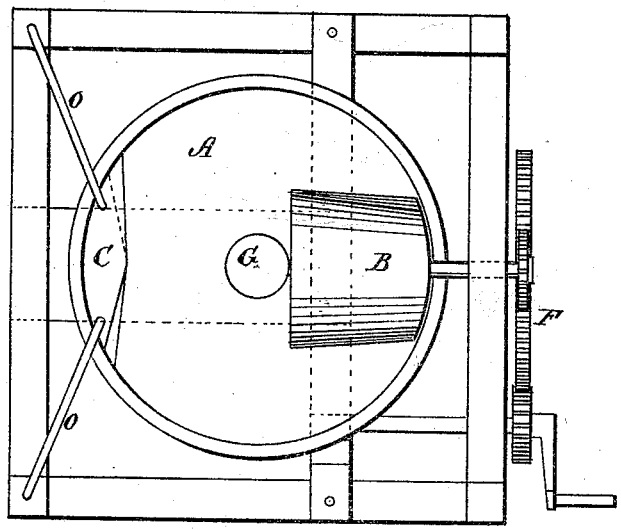
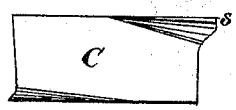
WITNESSES:
A. B. Robertson.
John C. Kenron
INVENTOR:
Wm H Lilly
BY
ATTORNEYS.

UNITED STATES PATENT OFFICE.

WILLIAM H. LILLY, OF BETHLEHEM, PENNSYLVANIA.

IMPROVEMENT IN BUTTER-WORKERS.

Specification forming part of Letters Patent No. 172,133, dated January 11, 1876; application filed November 30, 1875.

*To all whom it may concern:*

Be it known that I, WILLIAM H. LILLY, of Bethlehem, in the county of Northampton and State of Pennsylvania, have invented a new and Improved Butter-Worker; and I do hereby declare that the following is a full, clear, and exact description of the same, reference being had to the accompanying drawing, forming a part of this specification.

The chief parts or elements of my improved machine are a horizontal continuously-revolving bowl, A, having a concave bottom, a revolving worker, B, of peculiar construction, a stationary segmental block, C, for transferring the worked butter from the side toward the center of the bowl, and a central discharge, D, for the buttermilk. These parts, and the gearing necessary to operate such as rotate, are arranged in a frame having no peculiarity of construction.

Figure 1 is a sectional elevation of the machine; Fig. 2, a side elevation thereof, with part of the bowl broken out to show the form and position of the worker; Fig. 3, a plan view of the machine; Fig. 4, an elevation of the inner or working side of the segmental block.

A crown-wheel, E, is attached to the under side of bowl A, and meshes with a pinion forming part of a suitable gear-train, F. The worker B is mounted on a horizontal shaft having a similar connection with train F, so that said parts A B are simultaneously rotated, but at different speeds.

The worker B has three arms or projecting portions, $a$, each of which is rounded on its edge from the front backward, to adapt it to press or work on the floor of the bowl A. The worker B fills the space between the axis of the bowl and the side thereof; and the inner end of its shaft is journaled in a vertical tube or cap, G, which covers the upper end of the bowl-shaft H, and is concentric therewith. Said tube or cap G is cut out at $c$, contiguous to the floor of the bowl, and several holes are formed in said floor within the space inclosed by the end of the tube G. Short tubes $i$ are inserted in these holes, through which the buttermilk pressed or worked out of the butter escapes into the annular cavity of a stationary block, I, which is concentric with the bowl-shaft H, and has a side aperture, $m$, to allow escape of the buttermilk into a vertical tube, K, and thereby into any suitable vessel or receptacle placed beneath the machine.

Owing to the worker B being arranged radial to the axis or shaft of bowl A, its action is such as to crowd or push the butter outward, and cause it to accumulate around the inner side of the cavity of the bowl. In order to remove it nearer the shaft, into position to be again properly subjected to the action of the worker, I employ a segmental-shaped block, C, which is arranged on the side opposite the worker, and held rigidly in place by means of detachable rods $o\,o$, which extend to the adjacent corner-posts of the frame, as shown. The block may hence be readily removed when the butter has been sufficiently worked.

A lip, $s$, is formed on the upper edge and corner of the block, to assist in turning the butter inward toward the axis of the bowl.

The form of the worker B, and its arrangement with relation to the revolving bowl, render its action on the butter more even and perfect than that of the corrugated or fluted rollers heretofore generally employed; and the segmental block changes the position of the butter at each revolution of the bowl, so that it is re-presented to the worker in a different form and shape.

The bowl is also geared to rotate faster than the worker, so that the butter is, as it were, spread out over the floor of the bowl by the action of each of the arms $a$, as will be readily understood.

What I claim is—

1. The combination of the concave-bottom rotating bowl A and rotating worker B, arranged radially thereto, and having a series of arms, each provided with a rounded edge or extremity, as shown and described, to operate as specified.

2. The combination of the removable segmental block C and detachable rods o with the circular rotating bowl A, as shown and described, for the purpose specified.

3. The cap or tube G, the tubes i, the block having an annular cavity, and the discharge-tube K, combined with the concave rotating bowl A, as shown and described, to operate as specified.

The above specification of my invention signed by me this 22d day of November, A. D. 1875.

WILLIAM H. LILLY.

Witnesses:
SOLON C. KEMON,
CHAS. A. PETIT.